United States Patent [19]

Oshima et al.

[11] Patent Number: 4,958,422
[45] Date of Patent: Sep. 25, 1990

[54] WEAR-RESISTANT COMPOUND ROLL

[75] Inventors: Masahiko Oshima; Takumi Ohata; Toshiyuki Hatori, all of Kitakytusyu, Japan

[73] Assignee: 501 Hitachi Metals, Ltd., Japan

[21] Appl. No.: 320,644

[22] PCT Filed: Mar. 24, 1988

[86] PCT No.: PCT/JP88/00304

§ 371 Date: Nov. 22, 1988

§ 102(e) Date: Nov. 22, 1988

[87] PCT Pub. No.: WO88/07594

PCT Pub. Date: Oct. 6, 1988

[30] Foreign Application Priority Data

Mar. 24, 1987 [JP] Japan ................. 62-69666

[51] Int. Cl.$^5$ ............................................. B21B 31/08
[52] U.S. Cl. ...................... 29/129.5; 29/132; 164/98
[58] Field of Search ............ 29/129.5, 132; 164/448, 164/92.1, 98, 461

[56] References Cited

U.S. PATENT DOCUMENTS

| 3,455,372 | 7/1969 | Yamamoto | 164/92.1 |
| 3,968,551 | 7/1976 | Miyashita | |
| 3,997,370 | 12/1976 | Horvath, Jr. et al. | 29/132 X |
| 4,165,407 | 8/1979 | Endoh et al. | 29/132 |
| 4,484,959 | 11/1984 | Boucher et al. | 29/132 X |
| 4,547,470 | 10/1985 | Tanase et al. | 501/87 |
| 4,618,540 | 10/1986 | von Holst et al. | 419/41 X |
| 4,721,153 | 1/1988 | Sano et al. | 29/132 X |
| 4,726,417 | 2/1988 | Sano | 164/98 X |
| 4,839,949 | 6/1989 | Sobue et al. | 29/132 |

FOREIGN PATENT DOCUMENTS

| 051511 | 5/1982 | European Pat. Off. |
| 955240 | 1/1957 | Fed. Rep. of Germany |
| 2.728621 | 1/1978 | Fed. Rep. of Germany |
| 51-24969 | 7/1976 | Japan |
| 53-80351 | 7/1978 | Japan |
| 54-86422 | 7/1979 | Japan |
| 56-81657 | 7/1981 | Japan |
| 56-116859 | 9/1981 | Japan |
| 57-57862 | 4/1982 | Japan |
| 57-149450 | 9/1982 | Japan |
| 57-198243 | 12/1982 | Japan |
| 58-86974 | 5/1983 | Japan |
| 58-87249 | 5/1983 | Japan |
| 59-143048 | 8/1984 | Japan |
| 60-180608 | 9/1985 | Japan |
| 60-180609 | 9/1985 | Japan |
| 61-60256 | 3/1986 | Japan |
| 5923846 | 2/1989 | Japan |

Primary Examiner—Timothy V. Eley
Assistant Examiner—Frances Chin
Attorney, Agent, or Firm—Finnegan, Henderson, Farabow, Garrett & Dunner

[57] ABSTRACT

A wear-resistant compound roll comprising an outer layer made of an iron-base alloy containing such components as to precipitate at least one of carbides of W, V, Nb, Ti, Ta, Zr and Hf from an alloy melt in a solidification process thereof, and a steel shaft metallurgically bonded to the outer layer, the outer layer having a surface with a Shore hardness of 70 or more, and the shaft having a tensile strength of 55 kg/mm$^2$ or more and an elongation of 1.0% or more, and a boundary layer between the outer layer and the shaft being not weaker than weaker one of the outer layer and the shaft.

The iron-base alloy has a composition by weight % consisting essentially of 1.5–3.5% C, 0.3–3.0% Si, 0.3–1.5% Mn, 2–7% Cr, 9% or less Mo, 20% or less W, 3–15% V and balance substantially Fe.

8 Claims, 3 Drawing Sheets

1mm 0.1mm

1mm

WEAR-RESISTANT COMPOUND ROLL

FIELD OF THE INVENTION

The present invention relates to a wear-resistant compound roll for hot or cold rolling and a method of producing it.

BACKGROUND OF THE INVENTION

Widely used a rolls for rolling mills are compound rolls produced from cast iron by a centrifugal casting method. These compound rolls are those having a structure consisting of an outer layer made of a cast iron material in which a lot of highly wear-resistant carbides are precipitated, and an inner layer made of gray cast iron or ductile cast iron having large toughness. In this production method, however, only limited types of materials can be used for outer layers and inner layers.

Carbides of such elements as W, V, Nb, Ti, Ta, Zr, Hf, etc. have as high a Vickers hardness Hv as 2000 or more, and the inclusion of these carbides in outer layers is highly effective to increase the wear resistance of rolls. However, it is practically impossible to produce a compound roll comprising an outer layer precipitated with the above carbides and an inner layer strongly bonded thereto by a centrifugal casting method.

The reason for it is that since carbides formed from these elements have different specific gravities from that of a melt, they tend to be segregated due to a centrifugal action in the casting process. In addition, some of these elements are vulnerable to oxidation, making it extremely difficult to conduct melting, casting and bonding to the inner layer in the air. Further, in the centrifugal casting method in which gray cast iron or ductile cast iron containing graphite precipitates is used for the inner layer to provide it with sufficient toughness, when the outer layer contains a large amount of elements likely to form white cast iron, the formation of graphite in the inner layer is suppressed because of some components dissolved from the outer layer into the inner layer, making the inner layer brittle. In particular, since the carbides tend to be concentrated in a boundary between the inner layer and the outer layer, the boundary becomes brittle, making it likely that the outer layer peels off from the boundary.

In addition, when gray cast iron or ductile cast iron is used for the inner layer, the inner layer's tensile strength is at most 55 kg/mm² or so, and its elongation is less than 1%. If higher tensile strength and elongation are to be obtained, the inner layer should be made of steel materials. However, this is difficult in the centrifugal casting method. This is due to the fact that since the inner layer has a higher melting point than the outer layer when steel is used for the inner layer, the outer layer is melted during the casting of the inner layer, thereby providing, as a final solidification phase, a boundary portion made of a mixture of both layers, this boundary portion being a site likely to generate cast defects.

Accordingly, the centrifugal casting method has been unable to provide a compound roll comprising an outer layer containing a large amount of carbides of the above-described elements and an inner layer having a tensile strength of 55 kg/mm² or more and an elongation of 1.0% or more, both layers being strongly bonded to each other.

On the other hand, to increase the efficiency of rolling by increasing an amount of rolled products produced in a single roll repair cycle and to improve the size precision of rolled products, it has become necessary to drastically increase the wear resistance of rolls. At the same time, the improvement of size precision of rolled products makes it necessary to exert a bending force to both extending portions of a roll shaft in an opposite direction to the direction of deflection of the rolls caused by a rolling force, and the reduction of number of roll stands necessary to complete rolling makes it necessary to increase pressure applied to the rolls in a roll stand. This inevitably increases a bending force applied to both extending portions of the roll shaft, which in turn requires that the roll shaft has higher strength. However, in a roll in which an outer layer and a shaft are shrink-fitted or assembled, sliding may take place between the outer layer and the shaft, or the outer layer is susceptible to cracking during the rolling operation. Accordingly, the outer layer and the shaft should be completely metallurgically bonded to each other.

To satisfy these requirements at the same time, it is necessary that the outer layer is made of materials containing such components as to precipitate a large amount of carbides of elements such as W, V, Nb, Ti, Ta, Zr, Hf, etc., that the shaft is made of tough steel, and that the outer layer and the shaft are completely metallurgically bonded to each other. In this sense, casting methods such as the centrifugal casting method cannot be used for the above-described reasons. In addition, a diffusion bonding method between solid materials is not practically applicable because it needs extremely expensive facilities for relatively large objects such as rolls.

In view of the above circumstances, attention has been paid to a so-called shell casting method for manufacturing a compound roll by supplying a melt of an outer layer material around a central shaft made of cast steel or forged steel, bonding and solidifying the outer layer material to the shaft. Thus, compound rolls composed of various combinations of outer layers and shafts produced by the shell casting method have been proposed.

For instance, Japanese Patent Laid-Open No. 60-180608 discloses a compound roll for hot rolling having excellent resistances to adhesion of rolled materials and to surface roughening, which is composed of an outer layer and a shaft metallurgically bonded to each other, the outer layer being high-chromium cast iron containing, by weight, 2.0–3.5% C, 0.5–1.5% Si, 0.4–1.5% Mn, 8–25% Cr, 0.5–3.0% Mo, 10% or less V, 1.5% or less Ni and the shaft being made of cast steel or forged steel having a tensile strength of 55 kg./mm² or more and an elongation of 1.0% or more. The outer layer is formed on the shell prepared in advance, by supplying a melt of an outer layer material onto the shaft and metallurgically bonding them. Bonding strength between the outer layer and the shell is higher than or equal to the strength of weaker one of the outer layer and the shaft, and the outer layer has a Shore hardness of 70 or more and, the decrease in its Shore hardness by a depth of 100 mm from its surface is 3 or less.

Japanese Patent Laid-Open No. 60-180609 discloses a high-chromium cast iron compound roll for cold rolling composed of an outer layer made of high-chromium cast iron and a shaft made of cast or forged steel with a surface hardness of 90 or more in Shore hardness, the outer layer being formed on the shell prepared in advance, by supplying a melt of an outer layer material onto the shell and metallurgically bonding it to the shell. The high-chromium cast iron of the outer layer consists essentially of, by weight, 2.5-3.5% C, 0.5-1.5% Si, 0.4-1.5% Mn, 0.5-3.0% Ni, 8-25% Cr, 1.0-5.0% Mo and balance substantially Fe, and the shaft has a tensile strength of 55 kg/mm$^2$ or more and an elongation of 1.0% or more. Bonding strength between the outer layer and the shaft is higher than or equal to the strength of weaker one of the outer layer and the shaft.

Since the outer layers are made of high-chromium cast iron in both of the above compound rolls, their wear resistance is generally high, but it is not necessarily sufficient to satisfy the demanded level which is getting increasingly higher in recent years.

Japanese Patent Publication No. 51-24969 discloses an extremely wear-resistant steel having an iron matrix containing 0.2-0.6 weight % C and at least one selected from 2 weight % or less Ni, 2-6 weight % Cr, 1-6 weight % Mo, 1-6 weight % W and 10 weight % or less Co, in which carbides formed from 5-12 weight % V, 3-10 weight % Nb and carbon in an amount necessary for bonding to them are precipitated. It is described that this extremely wear-resistant steel can be used for rolls, but no description is given about its use for compound rolls.

In view of the above problems, an object of the present invention is to provide a wear-resistant compound roll composed of an outer layer made of a material in which hard carbides of W, V, Nb, Ti, Ta, Zr, Hf, etc. are precipitated, and a shaft made of tough steel, the outer layer free from the segregation of carbides and the shaft being metallurgically bonded to each other, and a method of producing such a wear-resistant compound roll in the air with relatively small cost.

DISCLOSURE OF THE INVENTION

The wear-resistant compound roll according to the present invention comprises an outer layer made of an iron-base alloy containing such components as to precipitate at least one of carbides of W, V, Nb, Ti, Ta, Zr and Hf from an alloy melt in a solidification process thereof, and a steel shaft metallurgically bonded to the outer layer, the outer layer having a surface with a Shore hardness of 70 or more, and the shaft having a tensile strength of 55 kg/mm$^2$ or more and an elongation of 1.0% or more, and a boundary layer between the outer layer and the shaft being not weaker than weaker one of the outer layer and the shaft.

The method of producing such a wear-resistant compound roll according to the present invention comprises the steps of introducing the steel shaft concentrically into an inner space defined by a composite mold comprising a refractory mold surrounded by an induction heating coil and a cooling mold provided under the refractory mold concentrically therewith; pouring a melt of the iron-base alloy into a space between the shaft and the composite mold; keeping the melt in the space while heating and stirring it at a temperature between a temperature of precipitating primary crystals and that higher than the primary crystal-precipitating temperature by up to 100° C., with a surface of the melt sealed by a flux; moving the shaft downwardly concentrically with the composite mold, thereby solidifying the melt by contact with the cooling mold while bonding it to the shaft, so that the outer layer is continuously formed on the shaft.

BEST MODE FOR CONDUCTING THE INVENTION

Figure 1:
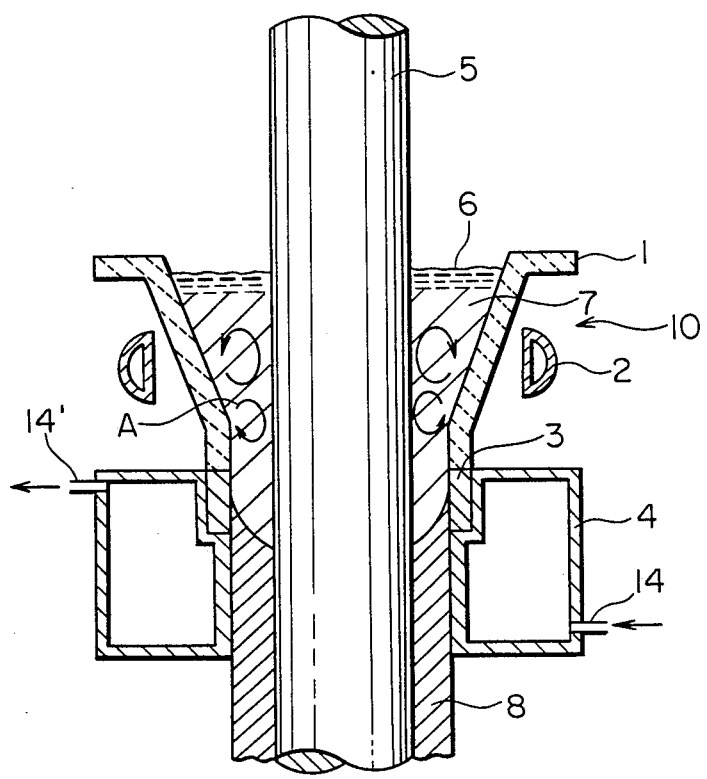
FIG. 1 is a schematic cross-sectional view showing an apparatus for conducting the method of the present invention.

The wear-resistant compound roll according to the present invention comprises an outer layer made of an iron-base alloy and a steel shaft metallurgically bonded to the outer layer. The above iron-base alloy contains such components as to precipitate at least one of carbides of W, V, Nb, Ti, Ta, Zr and Hf from a melt in its solidification process. Particularly, the above iron-base alloy preferably consists of, by weight, 1.5-3.5% C, 0.3-3.0% Si, 0.3-1.5% Mn, 2-7% Cr, 9% or less Mo, 20% or less W, 3-15% V and balance substantially Fe.

C is indispensable for forming carbides to increase the wear resistance of the roll. If it is less than 1.5%, the amount of carbides precipitated is small, resulting in insufficient wear resistance. In addition, in balance with V, when C is less than the above lower limit, the carbides are precipitated in a network manner in the grain boundaries, making it impossible to achieve the object of the present invention in terms of toughness and resistance to surface roughening. On the other hand, when C exceeds 3.5%, its balance with V is destroyed, resulting in failure to provide an alloy structure in which VC is uniformly distributed, which in turn results in poor resistance to surface roughening and toughness.

Si is a necessary element as a deoxidizer. It is also effective to save expensive elements such as W, Mo, etc., because such expensive elements can be replaced by Si dissolved in $M_6C$ carbides. When it is less than 0.3%, there is no deoxidizing effect, making it likely that casting defects appear in cast iron products. When it exceeds 3.0%, the resulting cast iron becomes too brittle.

Mn has a function of deoxidizing and trapping S, which is an impurity, as MnS. When it is less than 0.3%, sufficient deoxidizing effect cannot be achieved. However, when it exceeds 1.5%, retained austenite tends to be generated, making it difficult to maintain stably sufficient hardness.

With respect to Cr, when it is less than 2%, hardenability of the alloy becomes poor, and when it exceeds 7%, too much chromium carbides are generated. This is undesirable because chromium carbides such as $M_{23}C_6$ are lower than MC, $M_4C_3$, $M_6C$, $M_2C$ in hardness, so that they tend to reduce wear resistance.

Mo is necessary for obtaining good hardenability and high-temperature hardness, but when it exceeds 9%, the amount of $M_6C$ carbides increases in a balance between C, V and Mo, undesirably deteriorating toughness and resistance to surface roughening. Accordingly, the upper limit of Mo content is 9%.

W is necessary for keeping high-temperature hardness, but when it exceeds 20%, the amount of $M_6C$ carbides increases, undesirably deteriorating toughness and resistance to surface roughening. Accordingly, its upper limit is 20%.

V is an indispensable element for forming an MC carbides which are effective for increasing wear resistance. When it is less than 5%, sufficient effects cannot be obtained, and when it exceeds 15%, uniform distribution of the MC carbides can hardly be obtained in balance with the above range of C.

In addition to the above elements, the iron-base alloy for the outer layer according to the present invention may further contain Ni, Co or Nb alone or in combination.

Ni has a function to improve the hardenability of the alloy. Accordingly, it can be added in an amount up to 5%. However, when exceeding this amount, retained austenite becomes too much, causing problems such as cracking and surface roughness in rolling operations. Accordingly, its upper limit is 5%.

Co is a useful element in terms for resistance to temper softening and secondary hardening. When it exceeds 5%, however, the hardenability of the alloy is deteriorated.

Nb has a function of forming MC carbides, thereby improving wear resistance like V, but when it exceeds 5%, too much oxidation takes place, making it difficult to melt in the atmosphere.

Ni, Co and Nb may be added alone, but they can be added in combination.

Besides, at least one of Ta, Zr, Hf and Ti which are capable of forming MC carbides can be added to improve wear resistance.

Further, at least one of rare earth elements such as La, Ce and Nd can be added. These rare earth elements, when added with Nb, produce Nb-rare earth carbides which are finely and uniformly dispersed.

In the iron-base alloy for an outer layer according to the present invention, the amount of N contained is desirably 0.15% or less. In the alloy of the present invention, N is usually contained in an amount of 0.005–0.10%, showing an effect of improving temper hardening. However, when its amount becomes excessive, the alloy becomes brittle. Accordingly, its upper limit is 0.15%.

Beside the above elements, the iron-base alloy consists substantially of iron except for impurities. Major impurities are P and S, and it is desired that P is 0.1% or less and S is 0.08% or less for preventing the alloy from becoming brittle.

The shaft of the compound roll of the present invention is made of steel, and it may be cast steel or forged steel. It is necessary that the shaft has a tensile strength of 55 kg/mm$^2$ or more and an elongation of 1.0% or more. This is because when used for rolling, it is subjected to large pressure, and a bending force is applied both ends of the shaft to compensate the deflection of the roll during the rolling operation, so that it can withstand such pressure and bending force. In addition, the shaft should be strongly bonded to the outer layer made of the above iron-base alloy. Accordingly, the bonding strength of a boundary portion should be higher than or equal to the mechanical strength of weaker one of the outer layer and the shaft.

To form the outer layer around the steel shaft at such high bonding strength, the following method is conducted.

Such method is basically disclosed in Japanese Patent Laid-Open No. 61-60256, and it is a method of continuously forming an outer layer around the steel shaft by using a high-frequency coil.

FIG. 1 shows an example of an apparatus capable of conducting the process of the present invention. This apparatus comprises a composite mold 10 comprising a funnel-shaped refractory mold 1 having a tapered portion and a cylindrical portion and a cooling mold 4 provided under the refractory mold concentrically.

The refractory mold 1 is surrounded by an annular induction heating coil 2, and a lower end of the refractory mold 1 is provided with a concentrical, annular buffer mold 3 having the same inner diameter as that of the refractory mold 1. Attached to a lower end of the buffer mold 3 is a cooling mold 4 having substantially the same inner diameter as that of the buffer mold 3. Cooling water is introduced into the cooling mold 4 through an inlet 14 and discharged through an outlet 14'.

A roll shaft 5 is inserted into a composite mold 10 having the above structure. The shaft 5 is provided with a closure member (not shown) having substantially the same diameter as that of an outer layer to be formed at a lower end of the shaft or at a position appropriately separate from the lower end of the shaft. The lower end of the shaft 5 is mounted to a vertical movement mechanism (not shown). A melt 7 is introduced into a space between the shaft 5 and the refractory mold 1, and a surface of the melt 7 is sealed by a melted flux 6 to prevent the melt from being exposed to the air. And to prevent the solidification of the melt 7, it is heated and stirred by the heating coil 2. The melt 7 is stirred by convection in the direction shown by the arrow A in FIG. 1. Next, the shaft 5 is gradually moved downward together with the closure member fixed thereto. Due to the downward movement of the shaft and the closure member, the melt 7 is lowered and begins to be solidified when contacted with the buffer mold 3 and the cooling mold 4. By this solidification, the shaft and the outer layer are completely metallurgically bonded. The surface of the melt held in the refractory mold 1 is also lowered together with the descent of the shaft 5 and the closure member, but a fresh melt is appropriately supplied to keep the melt surface at a certain level. By successively repeating the descent of the shaft 5 and pouring of the melt 7, the melt 7 is gradually solidified from below to form an outer layer 8.

The compound roll thus prepared is further subjected to heat treatment such as hardening and tempering to obtain a desired hardness of the outer layer. In the resulting compound roll, a surface hardness of the outer layer is 70 or more in Shore hardness, and the shaft has a tensile strength of 55 kg/mm$^2$ or more and an elongation of 1.0% or more, the outer layer and the shaft being metallurgically bonded to each other, so that the bonding strength of the boundary portion therebetween is not lower than the strength of weaker one of them.

The present invention will be explained in further detail by means of following Examples.

Example 1

Each of melts for outer layers having the compositions shown in Table 1 was poured into a $CO_2$ sand mold having a diameter of 70 mm and a height of 80 mm to cast a small roll for rolling wear test. This roll material was subjected to heat treatment comprising hardening at 1000°–1100° C. and tempering at 500°–550° C. and then it was formed into a test roll having an outer diameter of 60 mm, an inner diameter of 35 mm and a length of 40 mm.

Figure 2:
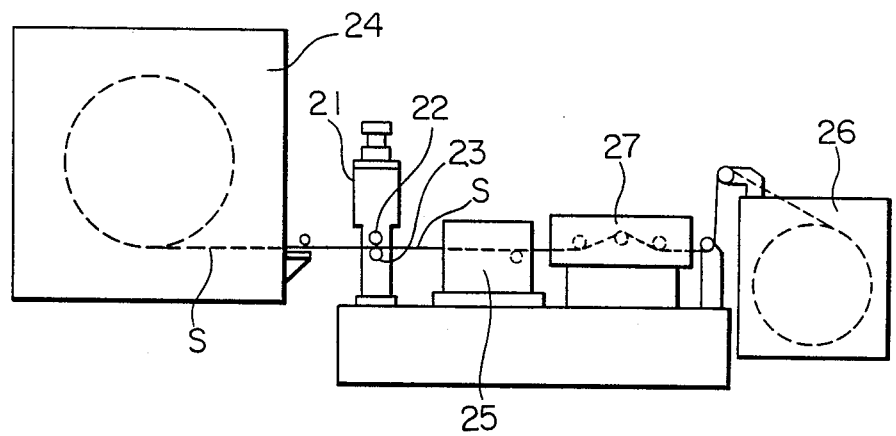
FIG. 2 is a schematic view showing a rolling wear test apparatus for conducting a wear test of an outer layer of a roll.

The surface hardness of each test roll was measured by a Shore hardness tester, and the results are shown in Table 2. Next, this test roll was subjected to a rolling wear test. A rolling wear test machine used is as shown in FIG. 2, comprising a rolling mill 21, an upper roll 22 and a lower roll 23 in the rolling mill 21, a heating furnace 24 for preheating a sheet to be rolled S, a cooling water bath 25 for cooling the rolled sheet S, a reel 26 for giving a constant tension to the sheet during rolling operation, and a tension controller 27 for adjusting the tension. The test conditions was as follows:

| | |
|---|---|
| Sheet to be rolled: | SUS 304, 1 mm thick and 15 mm wide |
| Rolling distance: | 800 m |
| Rolling temperature: | 900° C. |
| Rolling reduction: | 25% |
| Rolling speed: | 150 m/minute |
| Roll cooling: | Water cooling |

Figure 3:
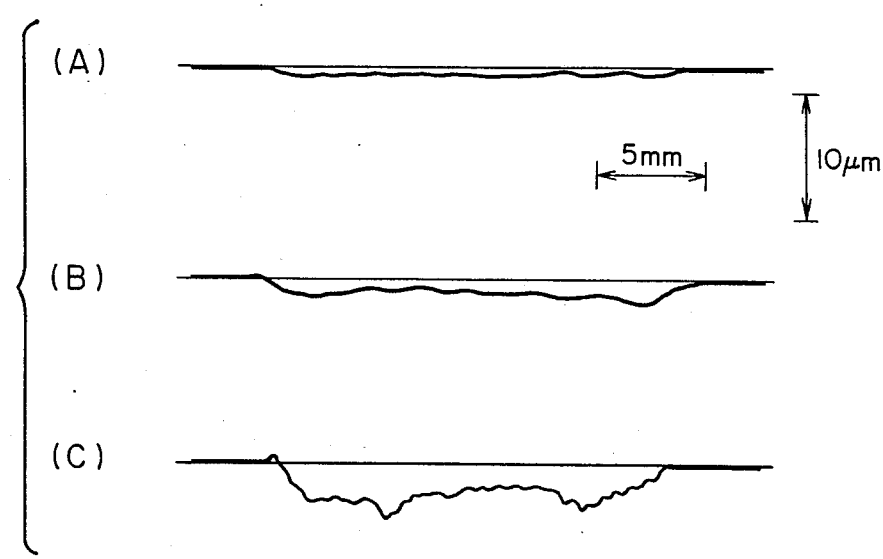
FIG. 3 is a graph showing wear profiles of rolls of the present invention and Comparative Example detected by the roll wear test apparatus.

Wear depth on the surface of the test roll was measured by a needle contact-type surface roughness tester (SURFCOM). The results are shown in FIG. 3 (A) for Sample No. 1. And for each roll the wear depth was averaged in a rolling width to obtain an average wear depth. The results are shown in Table 2.

Comparative Examples 1, 2

Example 1 was repeated to produce a test roll by using, as conventional materials, high-chromium cast iron (Comparative Example 1) and grain roll alloy material (Comparative Example 2). However, it should be noted that with respect to the heat treatment, appropriate conditions were selected for these materials. As in Example 1, a wear test was conducted and the measured values of wear depth are shown in FIGS. 3 (B) (Comparative Example 1) and (C) (Comparative Example 2). And the measured hardness is also shown in Table 2.

TABLE 1

| Sample No. (1) | Composition of Iron-Base Alloy Melt for Outer Layer (weight %) | | | | | | | | | | | | | | | | |
|---|---|---|---|---|---|---|---|---|---|---|---|---|---|---|---|---|---|
| | C | Si | Mn | Ni | Cr | Mo | V | W | Nb | Co | Ta | Zr | Hf | Ti | La | Ce | Nd |
| 1 | 2.7 | 0.8 | 0.9 | 0.2 | 4.4 | 6.3 | 7.8 | 4.2 | — | 1.4 | — | — | — | — | — | — | — |
| 2 | 2.9 | 0.6 | 1.0 | 0.2 | 4.6 | 6.6 | 7.9 | 5.2 | — | — | — | — | — | — | — | — | — |
| 3 | 2.7 | 1.4 | 0.9 | 0.03 | 3.5 | 5.5 | 8.5 | 4.5 | 2.4 | 2.0 | — | — | — | — | — | — | — |
| 4 | 2.6 | 0.8 | 1.1 | 0.2 | 4.2 | 5.7 | 8.2 | 4.1 | 2.5 | — | — | — | — | — | — | — | — |
| 5 | 2.6 | 0.8 | 0.8 | 0.05 | 4.0 | 6.2 | 8.1 | — | — | 1.6 | — | — | — | — | — | — | — |
| 6 | 2.8 | 0.9 | 1.0 | 0.1 | 4.3 | 6.2 | 8.3 | — | — | — | — | — | — | — | — | — | — |
| 7 | 2.6 | 0.8 | 0.9 | 0.2 | 4.3 | 6.0 | 8.3 | — | 2.1 | — | — | — | — | — | — | — | — |
| 8 | 2.9 | 1.3 | 1.0 | 0.05 | 4.2 | 6.5 | 7.8 | — | 3.0 | 2.7 | — | — | — | — | — | — | — |
| 9 | 2.8 | 0.9 | 1.0 | 2.3 | 4.5 | 6.3 | 8.0 | 4.3 | — | — | — | — | — | — | — | — | — |
| 10 | 2.7 | 1.1 | 0.9 | 3.0 | 4.0 | 5.9 | 8.2 | 4.4 | 3.2 | 3.1 | — | — | — | — | — | — | — |
| 11 | 2.7 | 0.9 | 0.8 | 0.3 | 4.2 | 6.1 | 8.5 | 3.8 | 2.8 | — | — | — | — | — | 0.05 | 0.13 | 0.06 |
| 12 | 2.8 | 0.8 | 1.0 | 0.2 | 4.3 | 6.2 | 8.3 | 3.6 | 2.7 | — | — | — | — | — | 0.04 | 0.14 | 0.05 |
| 13 | 2.6 | 0.9 | 0.9 | 0.4 | 4.1 | 6.0 | 8.5 | 4.2 | 1.6 | — | 0.1 | 0.2 | 0.1 | 0.2 | — | — | — |
| 14 | 2.8 | 0.8 | 0.9 | 0.3 | 4.5 | 5.8 | 8.0 | 3.2 | 1.7 | — | 0.1 | 0.2 | 0.1 | 0.2 | — | — | — |
| 15 | 2.9 | 0.6 | 0.6 | 0.4 | 4.3 | 5.5 | 7.8 | 3.6 | 1.6 | — | — | 0.1 | — | 0.2 | 0.03 | 0.12 | 0.04 |
| 16 | 2.7 | 0.9 | 1.0 | 0.2 | 4.1 | 6.1 | 7.7 | 3.8 | 1.8 | — | — | 0.2 | — | 0.2 | 0.02 | 0.14 | 0.03 |
| 17 | 2.6 | 0.7 | 1.0 | 1.3 | 15.0 | 1.1 | — | — | — | — | — | — | — | — | — | — | — |
| 18 | 3.3 | 0.8 | 0.8 | 4.2 | 1.6 | 0.3 | — | — | — | — | — | — | — | — | — | — | — |

Note (1):
Sample Nos. 1–16: Present invention
Sample Nos. 17 and 18: Comparative Examples

TABLE 2

| Sample No. (1) | Hardness (HS) | Average Wear Depth ($\mu m$) |
|---|---|---|
| 1 | 83 | 0.6 |
| 2 | 82 | 0.6 |
| 3 | 80 | 0.5 |
| 4 | 82 | 0.4 |
| 5 | 81 | 0.7 |
| 6 | 81 | 0.6 |
| 7 | 82 | 0.5 |
| 8 | 86 | 0.5 |
| 9 | 85 | 0.6 |
| 10 | 83 | 0.6 |
| 11 | 82 | 0.5 |
| 12 | 82 | 0.5 |
| 13 | 83 | 0.5 |
| 14 | 82 | 0.6 |
| 15 | 82 | 0.6 |
| 16 | 83 | 0.6 |
| 17 | 75 | 1.5 |
| 18 | 78 | 2.3 |

Note (1):
Sample Nos. 1–16: Present invention
Sample Nos. 17 and 18: Comparative Examples

Example 2

By using melts for outer layers having compositions shown in Tables 3 and shafts having diameters and materials shown in Table 4, compound rolls were produced by means of the apparatus shown in FIG. 1. The preheating temperature of each shaft and the temperature of each melt for an outer layer are shown in Table 3. A melt surface was sealed by a flux in a molten state to prevent the melt from being exposed to the air. The compound rolls thus produced had sizes as shown in Table 3. Each compound roll was subjected to heat treatment comprising hardening at 1000°–1100° C. and tempering at 500°–550° C.

In each compound roll, no cracking, etc. were caused by the above heat treatment. The surface hardness of each outer layer was measured by a Shore hardness tester. The results are shown in Table 4.

TABLE 3

| Sample No. | Roll Size Roll Diameter × Roll Length (mm) | Composition of Iron-Base Alloy Melt for Outer Layer (weight %) | | | | | | | | |
|---|---|---|---|---|---|---|---|---|---|---|
| | | C | Si | Mo | Ni | Cr | Mo | V | W | Co | Nb |
| 1 | 600 × 1000 | 2.7 | 0.8 | 1.0 | 0.2 | 4.3 | 6.4 | 7.6 | 4.1 | 1.5 | — |
| 2 | 600 × 1000 | 2.8 | 0.7 | 1.0 | 0.2 | 4.5 | 6.6 | 7.8 | 5.0 | — | — |
| 3 | 450 × 800 | 2.7 | 0.6 | 0.9 | 0.1 | 3.7 | 5.4 | 8.2 | 4.5 | 2.0 | 2.3 |
| 4 | 450 × 800 | 2.6 | 0.7 | 1.0 | 0.2 | 4.1 | 5.8 | 8.0 | 4.6 | — | 2.5 |
| 5 | 330 × 650 | 2.7 | 0.8 | 0.9 | 0.2 | 4.0 | 6.0 | 8.0 | — | 1.8 | — |
| 6 | 330 × 650 | 2.7 | 0.9 | 1.1 | 0.1 | 4.2 | 6.3 | 8.4 | — | — | — |
| 7 | 330 × 650 | 2.6 | 0.7 | 1.0 | 0.2 | 4.4 | 6.1 | 8.1 | — | — | 2.3 |
| 8 | 330 × 650 | 2.9 | 0.8 | 1.0 | 0.1 | 4.1 | 6.5 | 7.9 | — | 2.8 | 3.1 |

TABLE 4

| Sample No. | Shaft Material | Shaft Diameter (mm) | Preheating Temperature of Shaft (°C.) | Temperature of Melt for Outer Layer (°C.) | Hardness of Outer Layer (HS) |
|---|---|---|---|---|---|
| 1 | Cast Steel (SCCrM3) | 450 | 600 | 1600 | 81–83 |
| 2 | Cast Steel (SCCrM3) | 450 | 600 | 1600 | 82–84 |
| 3 | Forged Steel (SCM440) | 320 | 800 | 1620 | 83–85 |
| 4 | Forged Steel (SCM440) | 320 | 800 | 1620 | 82–85 |
| 5 | Rolled Rod (SCM440) | 200 | 900 | 1640 | 85–87 |
| 6 | Rolled Rod (SCM440) | 200 | 900 | 1640 | 84–87 |
| 7 | Rolled Rod (SCM440) | 200 | 900 | 1640 | 85–87 |
| 8 | Rolled Rod (SCM440) | 200 | 900 | 1640 | 85–88 |

The compound roll (Sample No. 1) was machined radially in a portion bridging the outer layer and the shaft at a position 200 mm apart from an end of the roll barrel, to obtain a specimen which was then subjected to tensile test. The specimen was broken at a position in the iron-base alloy of the outer layer, showing a tensile strength of 64 kg/mm$^2$.

Figure 4:
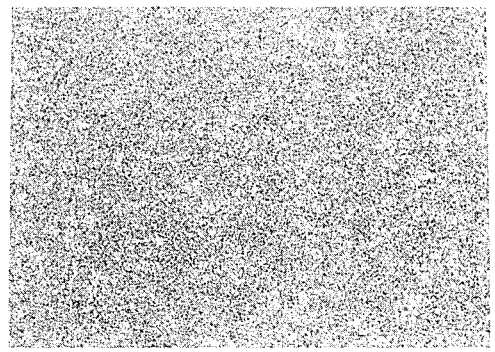
FIG. 4 is a photomicrograph showing a carbide distribution in the metal structure of an outer layer of the wear-resistant compound roll according to one embodiment of the present invention.

The roll was also machined in each part to provide specimens to observe their alloy structures. FIG. 4 shows the metal structure of the outer layer of the compound roll. As is clear from the microphotograph of FIG. 4, hard vanadium carbide particles are finely and uniformly dispersed, providing a good cast structure.

Figure 6:
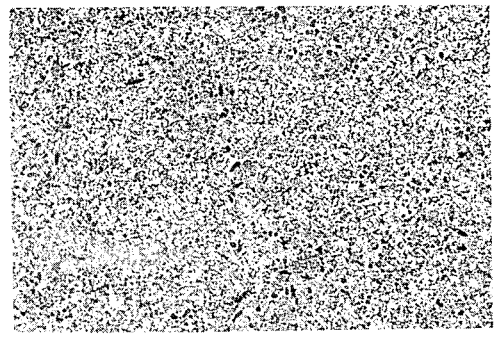
FIG. 6 is a photomicrograph of an outer layer of the wear-resistant roll of the present invention when cast by a usual stationary casting mode.

For comparison, FIG. 6 shows the observed structure of an alloy having the same components as above and cast by a usual stationary casting mold. Vanadium carbides are in a state of relatively large bulks, and their distribution is not uniform.

Figure 5:
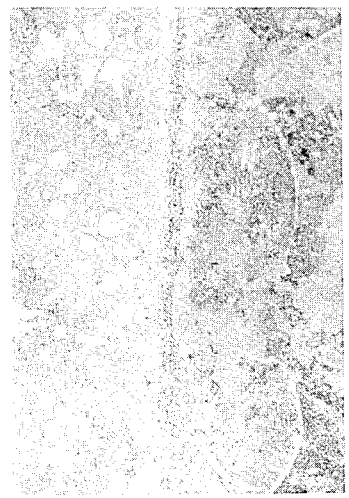
FIG. 5 is a photomicrograph showing the bonding state of an outer layer and a shaft of the wear-resistant compound roll according to one embodiment of the present invention.

FIG. 5 shows the observed structure of a boundary portion between the outer layer and the shaft. In this figure, the left side shows the outer layer, and the right side shows the shaft. In the boundary portion, there is no phenomenon that the carbides are concentrated, and good bonding state without any casting defects was observed.

Example 3

By using outer layer materials having the compositions shown in Table 4, compound rolls were produced by using the apparatus shown in Table 1. A shaft material was SCM 440. The production conditions were the same as in Example 2. Incidentally, Conventional Example represents an alloy grain roll cast by a conventional centrifugal casting method.

TABLE 5

| Sample No. (1) | | Composition of Outer Layer Materials (weight %) | | | | | | | |
|---|---|---|---|---|---|---|---|---|---|
| | | C | Si | Mn | Ni | Cr | Mo | V | W |
| 1 | Upper Roll | 2.0 | 0.5 | 0.5 | 0.2 | 6.4 | 2.3 | 6.2 | 4.1 |
| 1 | Lower Roll | 2.0 | 0.4 | 0.4 | 0.2 | 6.5 | 2.4 | 6.3 | 4.3 |
| 2 | Upper Roll | 3.2 | 0.9 | 0.5 | 3.4 | 1.4 | 0.3 | — | — |
| 2 | Lower Roll | 3.3 | 0.8 | 0.6 | 3.6 | 1.4 | 0.2 | — | — |

Note (1):
Sample No. 1: Present invention
Sample No. 2: Conventional Example

Further, the compound rolls of the present invention were subjected to heat treatment comprising hardening from 1050° C. and tempering at 530° C. The resulting compound roll had a following size:

| Roll diameter: | 312 mm |
|---|---|
| Roll length: | 500 mm |
| Outer diameter of shaft: | 230 mm |

The above rolls had hardness shown in Table 6 below.
With these rolls, flat steel plates were rolled. The number of rolled plates and wear of the rolls are shown in Table 6.

TABLE 6

| Sample No. | | Hardness (HS) | Number of Rolled Plates | Wear (mm) |
|---|---|---|---|---|
| 1 | Upper Roll | 81 | 133 | 0.03 |
| 1 | Lower Roll | 80 | 133 | 0.02 |
| 2 | Upper Roll | 78 | 70 | 0.15 |
| 2 | Lower Roll | 77 | 70 | 0.14 |

Note:
1: Present invention
2: Conventional Example

Incidentally, wear was measured in a center portion of the roll by means of an outside micrometer, and it is expressed by the reduction of the roll diameter.

As is evident from the above results, the compound roll of the present invention has high surface hardness and excellent wear resistance, and its shaft has high mechanical strength with good bonding strength between the outer layer and the shaft. On the contrary, the roll having an outer layer having a conventional composition outside the scope of the present invention does not have sufficient wear resistance.

Further, by using a shaft made of cast steel or forged steel according to the method of the present invention, the compound roll free from the segregation of the precipitated carbides and casting defects and having excellent wear resistance can be produced.

FIELD OF APPLICATION IN INDUSTRY

Since the compound roll of the present invention has good mechanical strength and excellent wear resistance, it can be widely used as a roll for cold rolling and hot rolling.

What is claimed is:

1. A wear-resistant compound roll comprising a steel core shaft having a tensile strength of 55 kg/mm$^2$ or more and an elongation of 1.0% or more, and an outer layer on said sheet having a surface with a Shore hardness of 70 or more and made of an iron-base alloy having a composition consisting essentially, by weight, of 1.5-3.5%, C, 0.3-3.0% Si, 0.3-1.5% Mn, 2-7% Cr, 9% or less Mo, 20% or less W, 3-15% V and balance substantially Fe; said outer layer being metallurgically bonded to said steel shaft by a shell casting method comprising using a composite mold comprising a refractory mold and a cooling mold provided under said refractory mold, supplying a melt of said iron-base alloy around said steel shaft in said refractory mold, keeping said melt in said refractory mold while heating and stirring it by an induction coil at a temperature in the range between a first temperature at which primary crystals are precipitated from said melt and a second temperature up to 100° C. higher than said first temperature, moving said steel shaft downwardly concentrically with said composite mold, thereby solidifying said melt by contact with said cooling mold and bonding solidified melt to said steel shaft; and a boundary layer between said outer layer and said shaft, said boundary layer having a tensile strength at least as high as that of the weaker of said outer layer and said shaft.

2. The wear-resistant compound roll according to claim 1, wherein said iron-base alloy further contains 5 weight % or less of Ni.

3. The wear-resistant compound roll according to claim 1, wherein said iron-base alloy further contains 5 weight % or less of Co.

4. The wear-resistant compound roll according to claim 1, wherein said iron-base alloy further contains 5 weight % or less of Nb.

5. The wear-resistant compound roll according to claim 1, wherein said iron-base alloy further contains 5 weight % or less of Ni and 5 weight % or less of Co.

6. The wear-resistant compound roll according to claim 1, wherein said iron-base alloy further contains 5 weight % or less of Ni and 5 weight % or less of Nb.

7. The wear-resistant compound roll according to claim 1, wherein said iron-base alloy further contains 5 weight % or less of Co and 5 weight % or less of Nb.

8. The wear-resistant compound roll according to claim 1, wherein said iron-base alloy further contains, by weight, 5% or less of Ni, 5% or less of Co and 5% or less of Nb.

* * * * *

UNITED STATES PATENT AND TRADEMARK OFFICE
CERTIFICATE OF CORRECTION

PATENT NO. : 4,958,422
DATED : September 25, 1990
INVENTOR(S) : WEAR-RESISTANT COMPOUND ROLL It is certified that error appears in the above-indentified patent and that said Letters Patent is hereby corrected as shown below:

On title page: Item [75]

"Inventors", line 2, change "Kitakytusyu" to

--Kitakyusyu--.

Claim 1, col. 11, line 18, change "sheet" to --shaft--.

Signed and Sealed this

Nineteenth Day of December, 1995

Attest:

BRUCE LEHMAN

*Attesting Officer*     *Commissioner of Patents and Trademarks*